(12) United States Patent
Berghmans et al.

(10) Patent No.: US 7,358,280 B2
(45) Date of Patent: Apr. 15, 2008

(54) PROCESS FOR PROCESSING EXPANDABLE POLYMER PARTICLES AND FOAM ARTICLE THEREOF

(75) Inventors: Michel Florentine Jozef Berghmans, Calgary (CA); Karel Cornelis Bleijenberg, Presto, PA (US); Joachim Teubert, Blumberg (DE); Alphonsus Catharina Gerardus Metsaars, Rijen (NL)

(73) Assignee: NOVA Chemicals (International) S.A., Fribourg (CH)

( * ) Notice: Subject to any disclaimer, the term of this patent is extended or adjusted under 35 U.S.C. 154(b) by 353 days.

(21) Appl. No.: 10/915,141

(22) Filed: Aug. 10, 2004

(65) Prior Publication Data
US 2005/0059747 A1    Mar. 17, 2005

Related U.S. Application Data

(60) Provisional application No. 60/495,458, filed on Aug. 15, 2003.

(51) Int. Cl.
*C08J 9/00*    (2006.01)
*C08J 9/18*    (2006.01)

(52) U.S. Cl. ............................ 521/56; 521/58; 521/60; 521/146

(58) Field of Classification Search .................. 521/56, 521/58, 60, 146
See application file for complete search history.

(56) References Cited

U.S. PATENT DOCUMENTS

| | | |
|---|---|---|
| 4,911,869 A | 3/1990 | Meyer et al. |
| 5,049,328 A | 9/1991 | Meyer et al. |
| 5,271,886 A | 12/1993 | Collom et al. |
| 6,127,439 A | 10/2000 | Berghmans et al. |
| 6,160,027 A | 12/2000 | Crevecoeur et al. |
| 6,242,540 B1 | 6/2001 | Crevecoeur et al. |
| 6,399,665 B1 | 6/2002 | August et al. |
| 6,455,599 B1 | 9/2002 | Berghmans et al. |
| 6,538,042 B1 | 3/2003 | Berghmans et al. |
| 6,573,306 B1 | 6/2003 | Berghmans et al. |
| 2002/0117769 A1 | 8/2002 | Arch et al. |

FOREIGN PATENT DOCUMENTS

WO    WO 00/15702    *    3/2000

* cited by examiner

*Primary Examiner*—Irina Zemel
(74) *Attorney, Agent, or Firm*—Gary F. Matz; Suzanne Kikel

(57) ABSTRACT

Process for processing expandable polymer particles e.g. polystyrene (EPS) that eliminates the maturing step between the pre-expander and molding steps. The expandable particles are first over pressurized with gas, e.g. air, carbon dioxide, nitrogen, and mixtures thereof, at a pressure between 500 and 8000 kPa and a temperature between −20° C. and 130° C. for 15 to 7200 minutes to create a gas pressure in the particles. Using the gas pressure in the particles, pre-expanding the particles with a heating medium, e.g. steam at a temperature between 100° C. and 120° C. and at a pressure ranging above atmospheric pressure and below the gas pressure in said particles, i.e. 50 to 200 kPa for 5 to 120 seconds. The pre-expanded particles are air dried in the pre-expander while holding a positive pressure in the particles; are optionally transferred to a pressure silo; and then are transferred to a molding machine where the gas pressure in the particles is used to form a foam article.

16 Claims, 2 Drawing Sheets

PROCESS FOR PROCESSING EXPANDABLE POLYMER PARTICLES AND FOAM ARTICLE THEREOF

This application claims the benefit of U.S. Provisional Application No. 60/495,458 filed Aug. 15, 2003.

BACKGROUND OF THE INVENTION

1. Field of the invention

The invention relates to a process for processing expandable polymer particles, e.g. expandable polystyrene (EPS) particles. More particularly, the invention relates to a process for processing expandable polymer particles that contain an organic or an inorganic blowing agent or mixtures thereof in varying amounts. The particles are first over pressurized with gas; pre-expanded and dried; and then fed without maturing into a molding machine to form a foam article.

2. Background Art

Polymer foam articles molded from expandable polymer particles are well known. According to conventional practice, the conversion from expandable polymer particles to a molded foam article generally occurs in three steps: pre-expansion, maturing, and molding. The most commonly known and used expandable polymer particles are expandable polystyrene particles referred to as EPS. These expandable particles are generally made as solid, relatively "high-density" polystyrene beads of a relatively small size, e.g. beads having a diameter of from about 0.2 to 4.0 millimeters and a bulk (packing) density of about 600 kg/m$^3$. Typically, these polystyrene beads are impregnated with a blowing agent, e.g. hydrocarbon, i.e. pentane, etc., and then heated with saturated steam to produce "pre-expanded" polystyrene particles, i.e. larger particles of lower density. If hydrocarbon is used as the blowing agent, the amount generally ranges from about 3.0% by weight to about 7.0% by weight based on the weight of the polystyrene. The blowing agent boils below the softening point of the polystyrene and causes the beads to expand when they are heated with the saturated steam, resulting in the particles being pre-expanded to a lower bulk density of about 8 to 80 kg/m$^3$.

The pre-expanded particles, commonly referred to as "pre-puff" or "pre-foam", must be aged for at least about an hour, and generally about 8 to 24 hours, to allow the particles to mature before they can be molded into a foam article. During the maturing process, air permeates the particles, and the internal pressure of the particles, which is initially lower than atmospheric, gradually approaches atmospheric pressure. At the same time, the external and the internal moisture in the particles evaporate. If pentane is used as the blowing agent, the condensation of pentane creates an under pressure compared to atmospheric pressure. During maturing, this condition is equilibrated and is necessary for good molding.

For the maturing process, it is known that there is a relatively narrow window (e.g. a few hours) of the optimum aging (maturing) time that will yield the highest quality moldings at the minimum molding cycle times. The optimum maturing time is determined by trial and error and is a complex function of such variables as bead size, blowing agent level, bulk density, pre-expansion conditions and maturing conditions (e.g. temperature, ventilation, etc.).

For the maturing process, the pre-expanded particles are generally stored in large vented bags. In general, a substantial amount of storage space is required, and scheduling and inventory control of the bags are cumbersome. In addition, the maturing process takes time. Also, if pentane is used as the blowing agent, some pentane vapor is released from the bags. It is difficult to capture and destroy this released pentane vapor since the air volume is very large and the relative pentane content is low. This presents an environmental and safety hazard, and, requires proper ventilation in order to avoid explosive air-hydrocarbon mixtures. A further disadvantage with the conventional practice of maturing or aging the pre-expanded particles prior to molding is the reduction in the flexibility of the plant. That is, the pre-expanded particles require that they be used within two to 24 hours after the maturing process. Therefore, the manpower and molding equipment in the plant need to be readily available at this time.

It would be desirable to have a process that does not require a maturing step whereby pre-expanded polymer particles may be molded immediately after the particles are pre-expanded.

There have been some developments that do not require storage and maturing of an intermediate pre-expanded product.

Collum et al., U.S. Pat. No. 5,271,886 assigned to Arco Chemical Technology, L.P. and issued on Dec. 21, 1993, uses a moving stream that contains carbon dioxide-impregnated polymer particles and a heating fluid. A pre-expansion unit provides a heated and thermally insulated expanding pathway through which carbon-dioxide impregnated polymer particles and the moving heating fluid flow. The moving stream of steam containing the pre-expanded polymer particles exits from the pre-expansion unit and is directed into a molding machine. The moving heating fluid is charged to the pre-expansion unit at a temperature from 250° to 500° F., and preferably, super-heated steam at a temperature from 350° to 500° F.

A further development that eliminates the maturing process for pre-expanded particles prior to the molding step is disclosed in A. P. August et al., U.S. Pat. No. 6,399,665 B1 issued on Jun. 4, 2002. This patent discloses that the pre-expansion of EPS particles has long been carried out with heat of condensation from steam that permeates the beads and deposits water droplets within expanding cells of the beads. This invention uses dry heated gas, such as air, to pre-expand the raw EPS beads through conduction only. The outer layer of the beads are first heated by the hot air and the heat penetrates conductively inwardly thereby forming a more pre-expanded structure (with thinner cell walls) on the peripheral surface of the beads and a less expanded structure (with thicker cell walls) at the interior of the beads. The pre-expanded beads contain a higher percent content of blowing agent since the blowing agent is locked within the interior cells of each bead. The resultant pre-expanded beads are dry and can be used immediately in molding of EPS foam articles due to excellent flow characteristics and excellent expansion capability (due to high residual pentane content). These resultant beads differ from those pre-expanded with steam in that thermal conduction enlarges peripheral cells more than interior cells in each bead, while steam acts by convection to permeate each bead (and condense within each cell), thereby expanding both peripheral and interior cells to substantially the same degree.

Detailed information explaining the technical reasons for maturing the impregnated particles, particularly those for conventional EPS containing pentane as the blowing agent, are given in the background section of the above-discussed U.S. Pat. No. 6,399,665. The maturing period generally allows the internal pentane pressure within the cells and the atmospheric pressure to reach a steady state equilibrium as well as to dry the pre-expanded beads sufficiently so that condensed water vapor on the surfaces of the beads does not cause the beads to agglomerate into lumps, which may not easily pass through the filling valve used in filling the mold or may not flow into corners and narrow spaces of the mold itself. This aging period also permits some of the water droplets (from condensed steam) that are inside the cells to escape through the cell walls thus drying the inside of the foamed beads. Without inside drying, the trapped water droplets sometime induce local non-uniformities, e.g. holes in the molded article because each droplet requires longer heating to vaporize it before heating and expansion of the surrounding cell can progress. However, care must be taken that the aging period is not too long as too much of the remaining blowing agent (e.g. pentane) may be lost by diffusion out of the cells of the pre-expanded beads, resulting in pre-expanded beads that no longer have the ability to expand further when they are heated during molding. When the beads do not expand sufficiently during molding, the molded foam articles tend to be poorly fused, and often crumble into pieces or leak their contents i.e. coffee in the case of coffee cups. Thus, for many years, proper aging of pre-expanded beads has been a delicate balance between a sufficiently long time needed to dry the condensed steam introduced during pre-expansion, and a sufficiently short time to retain an adequate amount of blowing agent, e.g. pentane within the pre-expanded beads. Aging not only allows some of the pentane and condensed water vapor to escape through the cell walls to the surrounding atmosphere, but also allows air to permeate back into the vacuum left inside the cells following expansion so that the particles do not collapse during molding.

As stated hereinabove, the inventions of U.S. Pat. Nos. 5,271,886 and 6,399,665 are directed to a process for processing expandable polymer particles that require no maturing or aging of the particles after the pre-expansion step and before the molding step. U.S. Pat. No. 5,271,886 pertains to particles that contain carbon dioxide as a blowing agent, and U.S. Pat. No. 6,399,665 pertains to particles that contain pentane as a blowing agent.

A further example of expandable polymer particles with carbon dioxide as a blowing agent is Meyer et al. U.S. Pat. No. 4,911,869. This patent teaches that because of the rapidity with which the carbon dioxide diffuses out of the polymer particles, it is necessary to first pre-expand the particles and then re-impregnate the particles with the same or a different gas just prior to molding. The above discussed U.S. Pat. No. 5,271,886 gets around this problem by expanding the beads to their final density as the beads are in route to the molding operation without maturing and without re-inflating the pre-puff prior to molding.

The use of carbon dioxide gas as a blowing agent in expandable polymer particles is also disclosed in Meyer et al. U.S. Pat. No. 5,049,328. This patent combines the steps of impregnation, purification, and foaming into a single process, which overcomes the rapid diffusion of the carbon dioxide gas out of the particle. Again, the above U.S. Pat. No. 5,271,886 gets around this problem by expanding the beads to their final density as the beads are in route to the molding operation without maturing and without re-inflating the pre-puff prior to molding.

There is still a need in the art to provide a process which eliminates the maturing step generally associated with conventional expandable polymer particles regardless of the type and/or amount of blowing agent in the particles after the pre-expansion process so that the pre-expanded particles can be immediately fed into the mold and "good" quality foam articles are formed.

There is a further need to provide a process that may eliminate re-impregnation prior to molding.

SUMMARY OF THE INVENTION

The invention has met these needs. The invention provides a process for processing expandable polymer particles that eliminates the need for a maturing step between the pre-expansion and molding steps. If the expandable polymer particles contain an inorganic blowing agent, e.g. carbon dioxide or water, or contain a very low amount of organic blowing agent, e.g. about 1.0 to about 3.0% by weight pentane, the invention allows the particles to be immediately transferred from a pre-expansion step to a molding step.

The invention provides a process for processing expandable polymer particles into a foam article. The process comprises the steps of: a) subjecting expandable polymer particles to a pressurization step where a relatively high pressure is established in the particles; b) pre-expanding the particles so as to lower the density of the particles while retaining a sufficient positive pressure inside the particles and drying the pre-expanded particles while still maintaining a sufficient pressure in the particles; and c) immediately molding the pre-expanded particles to form a molded foam article.

More specifically, the process of the invention comprises the steps of: a) pressurizing the expandable polymer particles with compressed gas at a pressure and temperature to create a relatively high gas pressure inside the particles; b) using at least the gas pressure in the particles created in the pressurization step a), pre-expanding the particles with a heating medium while maintaining a sufficient positive pressure in the particles which pressure is above atmospheric pressure and directing a flow of hot dry air for a sufficient time onto the particles to dry the particles while maintaining a sufficient positive pressure in the particles which pressure is above atmospheric pressure; and c) immediately molding the particles into a foam article using at least the residual gas pressure in the particles.

Expandable polymer particles may have a bulk density of about 600 kg/m$^3$ and may contain an organic blowing agent, e.g. hydrocarbon, i.e. pentane, isopentane, and mixtures thereof and/or may contain an inorganic blowing agent, e.g. water, air, nitrogen, carbon dioxide, argon, neon and mixtures thereof. The amount of blowing agent in the expandable particles may range from about 0 weight percent to about 20 weight percent. The expandable particles may be "pre-nucleated", i.e. particles that have a previously established cell or pore structure where the apparent density of the expandable particles has been slightly decreased thus resulting in the volume being slightly increased. Or the expandable particles may be "non-nucleated", i.e. particles that have voids and no previously established cell or pore structure.

The invention may find particular application for processing expandable polystyrene particles that contain an organic blowing agent, e.g. pentane, in an amount less than about 3% by weight, or that contain an inorganic blowing agent such as water, carbon dioxide, air, or nitrogen, which inorganic blowing agent, e.g. carbon dioxide, as discussed hereinabove, generally dissipates quickly out of the cells and therefore out of the particles. In this instance, the pressurization step a) and the pressure of the heating medium applied to the particles in the pre-expansion step b) assure that the particles have sufficient pressure for the required expansion in the molding process to adequately fuse the particles together for the production of foam articles.

In the pressurization step, the expandable particles are over-pressurized with gas at a pressure ranging from about 500 kPa to about 8000 kPa and at a temperature ranging from about −20° C. to about 130° C. for about 15 minutes to about 7200 minutes (5 days). The result is that pressurized gas is created and remains in the particles, i.e. in the voids or in the cells of the particles. These pressurized particles are then transferred to the pre-expansion unit.

The pre-expansion unit contains a heating medium for pre-expanding the particles. The heating medium may be supplied at a pressure ranging from about 50 kPa to about 200 kPa and at a temperature ranging from about 100° C. to about 130° C. In general, the pressure in the pre-expander will be above atmospheric pressure and below the pressure inside the particles upon the particles exiting from the pressurization unit. This creates a pressure differential between the pressure in the particles as a result of the pressurization step and the pressure in the pre-expansion unit. The heating medium will cause the particles to soften, and the pressure differential in the particles will cause the particles to expand.

Within the pressurized atmosphere of the pre-expansion unit the particles may be subjected to a drying process, e.g. an air-drying process, at the pressure existing in the pre-expansion unit. That is, after the particles are pre-expanded a stream of hot dry air may be transported through the pre-expansion unit and onto the particles.

Alternatively, the drying of the particles can be done in a separate pressurized compartment of the pre-expansion unit or in a separate pressurization unit.

Preferably, the particles are transferred from the pre-expansion unit directly into the molding machine. However, depending on the production rate of the plant, it may be necessary to transfer the particles to a holding vessel until the molding machine is available. The holding vessel may be a vacuum tight pressure silo that maintains the pressure in the particles, or the holding vessel may have a small net airflow.

As stated hereinabove, the particles are transferred from the pre-expansion unit or from the pressure silo and to the molding machine. The pressure differential between the outside of the particles and the environment will be zero but the pressure inside the particles will be above atmospheric. As the pressurized particles enter the molding machine, the partial pressure of the gas inside the particles is greater than the air pressure inside the molding machine. This will allow the particles to further expand and fuse together when the particles are heated in the molding machine.

Since in the pre-expansion unit, the particles have a sufficient pressure and the particles are dried, the particles can be fed directly to the molding machine without maturing the particles.

Suitable gases supplied to the pressurization unit for developing a relatively high gas pressure therein include air, carbon dioxide, nitrogen, and mixtures thereof. Preferably, the gas is selected from the group consisting of air, carbon dioxide and mixtures thereof.

It is therefore an object of the present invention to provide a process for processing expandable polymer particles that applies a relatively high gas pressure to the particles and includes maintaining pressure in the particles thereby allowing the particles to be directly transferred from the pre-expansion unit to a molding machine without a maturing step.

It is a further object of the present invention to provide a process for processing expandable polymer beads into a molded foam article that over-presurizes the particles, pre-expands and dries the pressurized particles, and immediately molds the pressurized particles to form a foam article.

A still further object of the present invention is to provide a process for processing expandable polymer particles regardless of the amount and/or type of blowing agent in the expandable polymer particles that allows the particles to be molded immediately after the particles are pre-expanded.

And a still further object of the present invention is to over-pressurize the expandable particles so that a sufficient amount of pressure remains in the particles for pre-expansion and molding.

These and other objects of the invention will be better appreciated and understood when the following description is read along with the accompanying drawings and claims.

DETAILED DESCRIPTION OF THE INVENTION

Figure 1:
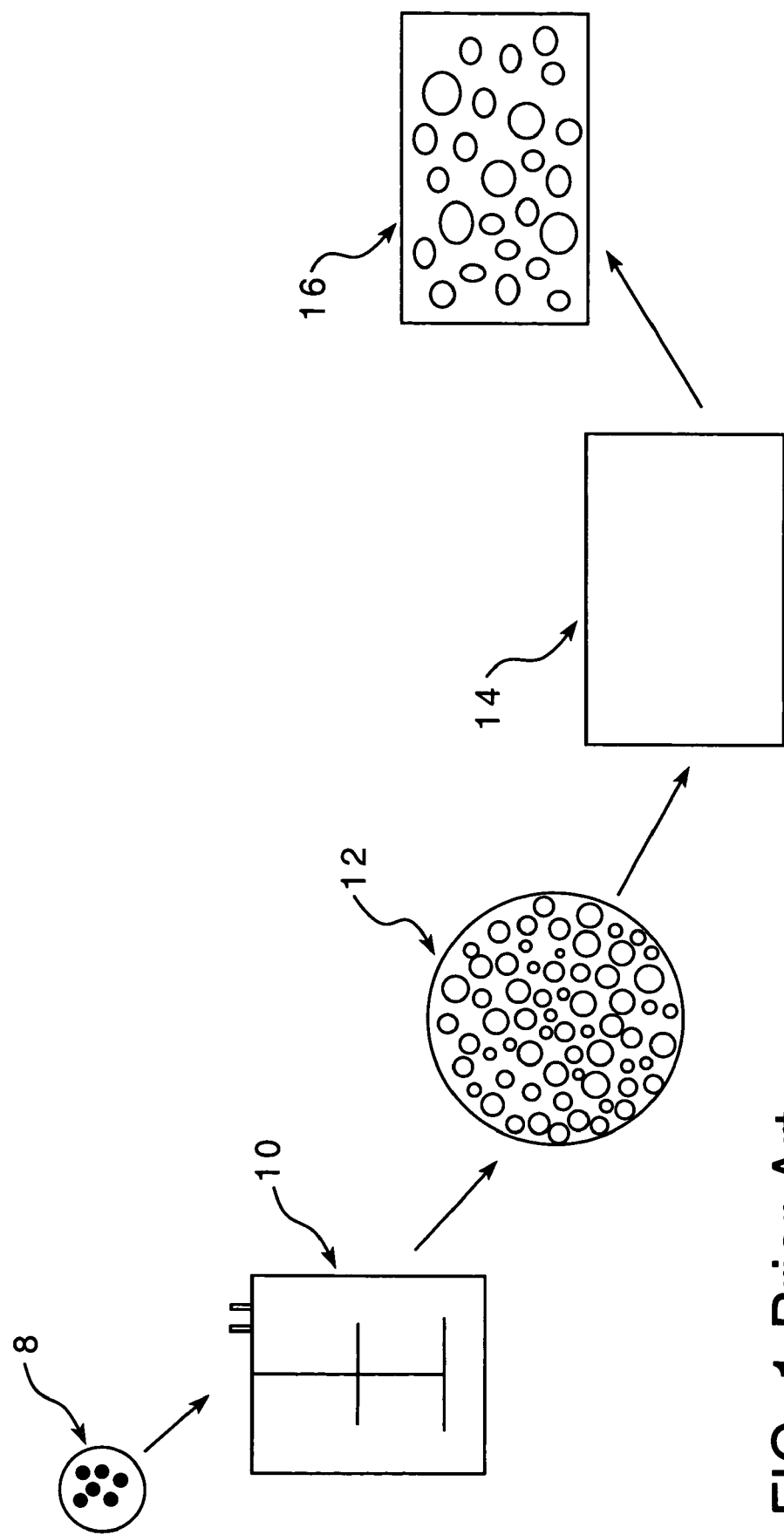
FIG. 1 is a schematic of the process of the prior art where conventional expandable polystyrene (EPS) particles are pre-expanded, matured, and molded.

FIG. 1 is a schematic of a conventional process for processing conventional expandable polystyrene particles. Expandable polystyrene particles 8 are fed to the pre-expansion unit 10 where steam is applied to the particles to lower the density of the particles. As discussed hereinabove, the lower density particles are transferred from the pre-expansion unit 10 into large vented bags for the maturing process 12, and are then transferred to the molding machine 14 to produce a finished foam article 16. In the particles of the prior art, if the blowing agent, e.g. pentane is too low, the particles generally are placed into a pressure tank (not shown) before entering and/or after exiting the pre-expansion unit 10.

Figure 2:
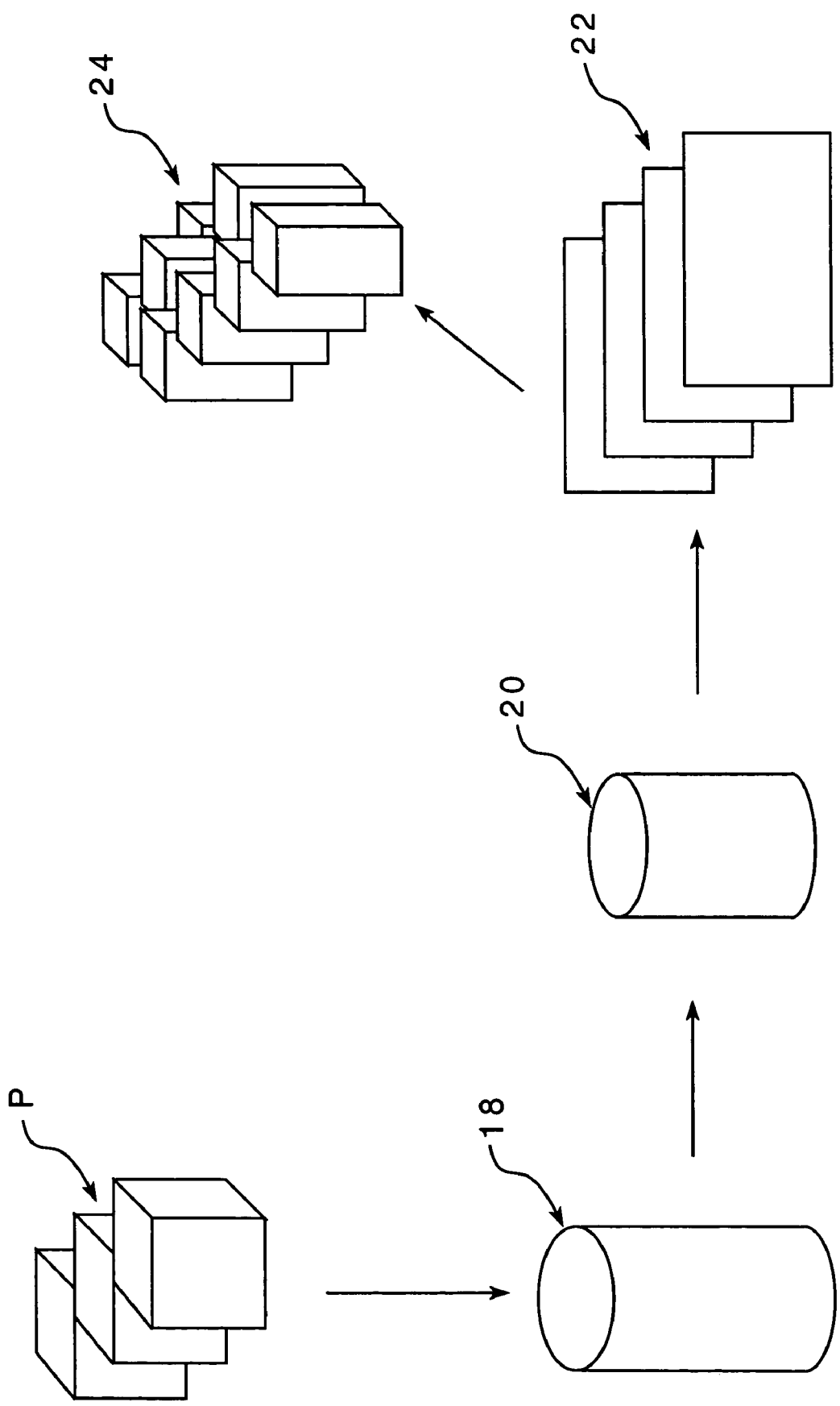
FIG. 2 is a schematic of the process of the invention where expandable polymer particles are pressurized, pre-expanded and dried, and then molded.

FIG. 2 is a schematic of the process of the invention. The process of the invention involves over-pressurizing expandable polymer particles in a pressure vessel 18 for a pressurization step, then transferring the polymer particles to a pre-expansion unit 20 for the pre-expansion and drying steps, and then immediately to a molding machine 22 for the molding step to produce a finished foam article 24.

"Particles" as used herein designate beads, pellets, or comminuted pieces.

Polymers suitable for use in the process of the invention are thermoplastic polymers. These polymers include, but are not limited to, polystyrene, styrene copolymers, e.g. styrenic/maleic anhydride copolymers, polyphenylene oxide, polystyrene-polyphenylene oxide blends, polyoxymethylene, poly(-methyl methacrylate), methyl methacrylate copolymers, polyethylene, polypropylene, ethylene-propylene copolymers, polyvinyl chloride, polycarbonate, polyethylene terephthalate, crosslinked variations thereof, rubber-modified versions thereof, blends thereof, and interpenetrating networks thereof, e.g. polyethylene and polymerized vinyl aromatic resins, such as polystyrene.

While a preferred embodiment will be discussed with reference to expandable polystyrene (EPS) particles, as indicated in the preceding paragraph, other expandable polymer particles, e.g. expandable polyethylene (EPE), expandable polypropylene (EPP), styrenic copolymers, etc. may be employed in carrying out the invention.

The polymer particles of the invention are expandable in that they generally contain a blowing agent. The blowing agent may be incorporated into the particles during forming of the particles. The blowing agent may be organic or inorganic or mixtures thereof. Organic blowing agents may be hydrocarbon, e.g. n-pentane (normal pentane), butane, isopentane, and mixtures of pentane, and preferably, n-pentane and mixtures of pentane. Inorganic blowing agents may be carbon dioxide, nitrogen, air, water, and other pneumatogens and mixtures thereof.

The blowing agent, particularly for expandable polystyrene particles, will generally range from about 0.1% to about 8% by weight based on the weight of the polymer. Incorporation of the blowing agent into the particles may occur when the particles are formed. This may occur in a one step suspension process or the blowing agent may be impregnated into the particles after the particles are formed in what is generally referred to as a two-step suspension process.

If little or no blowing agent exists in the particles, then the gas pressure applied to the particles in the pressurization step of the invention will provide sufficient pressure in the particles and pressure is maintained for the pre-expansion and molding steps. As an example, if 40 bar of pressure is applied to the particles for about three (3) hours in the pressurization step, the pressure in the beads may be about 22.5 bar.

A process had been developed that decreases or eliminates the fast diffusion rate of inorganic blowing agents, such as carbon dioxide and/or water. This process maybe referred to as "pre-nucleation". "Pre-nucleation" of the particles is achieved by slightly expanding the particles to a density that is not more than 3 times lower than the original density of the particles. The particles used in this pre-nucleation process may contain the inorganic blowing agents discussed herein above, i.e. carbon dioxide, nitrogen, air, water, and other pneumatogens and mixtures thereof, or may contain water and/or a small amount, e.g. about 2 weight percent or less, of an organic blowing agent, e.g. hydrocarbon liquid, e.g. pentane and/or mixtures thereof. In "pre-nucleation", the initial nuclei of the cells are formed in the particles. The nuclei of the cells are then used to subsequently further expand the particles with pressurized gas to the final bulk density of commercial interest.

The process for preparing pre-nucleated particles, i.e. particles that already have a certain cell structure is disclosed in the following two patent documents.

WO 00/15703 (U.S. Pat. No. 6,538,042 B1 issued on Mar. 25, 2003) relates to porous polyvinylarene particles. The unexpanded particles are slightly expanded to create porous particles having a certain cell structure and an apparent density ranging between 200 and 600 kg/m$^3$ and containing less than 2% by weight of an organic blowing agent. These porous particles have a volume increase that is from about 1.5 to less than 3 times compared to the volume of the unexpanded particles.

WO 00/15704 (U.S. Pat. No. 6,455,599 B1 issued on Sep. 24, 2002) relates to a process for the preparation of expanded porous particles by impregnating particles having a density ranging from 200 to 600 kg/m$^3$ with an inorganic gas and expanding the particles to a density that is not more than 3 times lower than the original density of the unexpanded particles.

A process for preparing expandable polymer particles that contain voids in the solid particles is disclosed in the following patent document.

WO 00/15702 (U.S. Pat. No. 6,573,306 B1 issued on Jun. 3, 2003) relates to a process for the preparation of expandable polyvinylarene particles in which solid polyvinylarene particles containing voids are impregnated by exposing the solid particles to an inorganic compound selected from the group consisting of $N_2$ and/or $O_2$ containing gas and a temperature below 95° C. and at a pressure of 100 to 2,000 kPa gauge to maintain the structure and properties of the voids in the solid particles. The inorganic gas contains a low volume of organic compounds and is less soluble in the polymer matrix compared to the organic compounds, and therefore, the inorganic gas remains essentially in the voids of the solid particles for an expansion of the particles.

For the process of the invention, the expandable polymer particles may be conventional expandable polymer, e.g. expandable polystyrene EPS) particles, expandable polypropylene (EPP) particles, expandable polyethylene (EPP) particles, containing an inorganic or an organic blowing agent, as discussed above. The expandable polymer particles may be pre-pre-nucleated particles prepared in accordance with the teachings of U.S. Pat. No. 6,538,042 (WO 00/15703) and U.S. Pat. No. 6,455,599 B1 (WO 00/15704), or the particles may be those prepared in accordance with the teachings of U.S. Pat. No. 6,573,306 B1 (WO 00/15702), the disclosures of which are all incorporated herein in their entirety by reference.

The blowing agent in the particles of the aforesaid patents, and therefore, the invention may also be carbon dioxide.

The expandable polymer particles may contain water that is blended with the aliphatic hydrocarbons blowing agents or water can be used as the sole blowing agent as taught in U.S. Pat. Nos. 6,127,439; 6,160,027; and 6,242,540 assigned to NOVA Chemicals (International) S.A. In these patents, water-retaining agents are used. The weight percentage of water for use as the blowing agent can range from 1 to 20%. The disclosures of U.S. Pat. Nos. 6,127,439, 6,160,027 and 6,242,540 are incorporated in their entirety herein by reference.

The expandable polymer particles may be produced via an extruder that has an under water cutter for forming small spherical pellets. In the extruder, a chemical blowing agent that releases carbon dioxide gas may be used as the blowing agent where the blowing agent is mixed into the polymer to "pre-nucleate", i.e. form cells in the polymer, as it exits the extruder die. Additional blowing agents such as gaseous carbon dioxide, pentane, HCFC'S, and CFC'S can also be added directly to the extruder. Also, expandable particles may be produced in an extruder with a blowing agent, e.g. pentane and without foaming at the die, for example when making non-nucleated particles.

The expandable polymer particles may be foamed cellular polymer particles as taught in Arch et al. U.S. patent application Ser. No. 10/021,716 assigned to NOVA Chemicals Inc. The foamed cellular particles are preferably polystyrene that are pre-expanded to a bulk density ranging between 600 kg/m$^3$ to about 200 kg/m$^3$, and contain an organic blowing agent level less than 6.0 weight percent, preferably ranging between 2.0 wt % to 5.0 wt %, and more preferably ranging between 2.5 wt % to 3.5 wt % based on the weight of the polymer. The disclosure of U.S. Ser. No. 10/021,716 is incorporated in its entirety herein by reference.

If the expandable polymer particles are foamed cellular polymer particles as discussed in the preceding paragraph or if the expandable polymer particles are conventional EPS particles, then there may be a sufficient amount of blowing agent in the particles that the pressurization step may not be necessary, for example, if the pentane level in the particles is at least 2% by weight. The pressurization step of the invention assures that there is adequate pressure in the particles, regardless of the type and amount of blowing agent in the particles so that the particles can be adequately fused together in the molding step.

In broadest terms, the invention relates to a process for processing expandable polymer particles that comprises a pressurization step, a pre-expansion step that includes a drying step, and a molding step. The particles may contain voids, cells, or cell-nucleating sites depending on the process the raw beads had been subjected to prior to being subjected to the process of the invention. For example, if the raw beads are pre-nucleated in accordance with the teachings of U.S. Pat. No. 6,538,042(WO 00/15703) and/or U.S. Pat. No. 6,455,599 B1 (WO 00/15704), the beads used in the process of the invention will generally contain cells. If the raw beads are "non-nucleated", i.e. first processed according to the teachings of U.S. Pat. No. 6,573,306 B1 (WO 00/15702), the beads used in the process of the invention will generally contain cell-nucleating sites.

In the pressurization step, the expandable polymer particles may have a bulk density ranging from about 600 kg/m$^3$ and in some instances, as low as about 16 kg/m$^3$. Preferably, the expandable polymer particles will have a bulk density ranging between about 200 kg/m$^3$ to about 600 kg/m$^3$, and in some instances, ranging between about 250 kg/m$^3$ and 500 kg/m$^3$. In the pressurization step, the particles are subjected to a compressed gas at a pressure ranging between about 500 kPa to about 8000 kPa and at a temperature ranging between −20° C. to 130° C. for a period of 15 minutes to about 7200 minutes (5 days), preferably less than 1440 minutes (24 hours) until the gas pressure in the particles, i.e. voids, cell-nucleating sites, or cells is sufficient for the required density reduction. If the pressure of the gas being applied to the particles is 2500 kPa, then the particles may be subjected to this gas at this pressure until a pressure of 2500 kPa is attained in the particles.

As stated in the preceding paragraph, the temperature of the gas in the pressurization unit preferably will range between −20° C. to 130° C. However, it has been found by the inventors that for expandable polystyrene particles temperatures higher than 90° C. tend to soften the polystyrene, and therefore, the temperature for expandable polystyrene needs to be about 90° C. or less. Also, it has been found that for expandable polystyrene particles in the pressurization unit, a period of one hour to about eight hours will be sufficient to achieve the desired pressure in the particles in preparation for the pre-expansion unit.

It will be appreciated that a lower density particle would require a lower pressure for the gas being supplied to the pressurization unit. That is, if the particles entering the pressurization unit have a density of about 16 kg/m$^3$, then the pressure in the pressurization unit may be below 500 kPa (5 bars), i.e. about 50 kPa (0.5 bar) to about 100 kPa (1.0 bar) since a high pressure of 8000 kPa (80 bar) will tend to crush the foam and to break the cells in the particles, etc., especially if the pressure is raised too quickly in the pressurization unit.

In order to assist in maintaining a desired and/or required pressure in the expandable particles obtained in the pressurization step, the particles can be conveyed through suitable means at a pressure, for example, of about 50 kPa to about 200 kPa, from the pressurization unit to the pre-expansion unit.

For the pre-expansion step, a pressure vessel is generally used. The pressure vessel may be an automatic batch device and the pre-expansion step may involve a continuous process. For example, the particles may flow into the pressure vessel on its one side, be pre-expanded and dried, and exit from the pressure vessel to the mold on its other side.

Expansion of the particles occurs in the pre-expansion step via a heating medium, which may have a temperature ranging between 100 to 120° C. (212° F. to 248° F.) and a pressure ranging between 50 to 200 kPa. The heating medium is applied to the particles for about 5 to 120 seconds to pre-expand the particles to a density ranging between about 193 kg/m$^3$ to about 8 kg/m$^3$ (i.e. about 12 pounds/cubic foot to about 0.5 pounds/cubic foot). For example, if according to conventional practice the density of the particles in the pressurizing step is about 600 kg/m$^3$ than according to conventional practice, the density of the particles as a result of the pre-expanding step will be about 8 kg/m$^3$. The heating medium may be any conventional heating medium, e.g. steam, hot air, hot water, radiant heat, convection heat, micro-wave heat, high frequency radiation, or electromagnetic.

Because there is a pressure differential between the pressure in the particles and the pressure in the pre-expansion unit, the particles will expand. The pressure remaining in the particles allows the particles to be molded.

One generally accepted method for pre-expansion of impregnated thermoplastic particles is taught in U.S. Pat. No. 3,023,175 to Rodman that uses steam for pre-expanding the particles. In the invention, the particles may be pre-expanded in a similar manner. However, as stated herein above, a certain pressure will remain in the particles while steam is applied for the expansion of the particles. The pressure in the pre-expansion unit may be maintained in the pre-expansion unit for the drying step.

The particles may be dried by injecting a flow or stream of hot dry air through the pre-expansion unit and onto the particles. During the drying step, the particles are consistently kept under a higher pressure so as to maintain an overpressure in the particles. This drying step may continue until the water vapor from the steam evaporates from inside the particles.

If the pressure in the pre-expansion unit is between 50 kPa to 200 kPa, then the pressure in the particles may range generally between 50 kPa and 200 kPa. If the pressure in the pre-expander is brought down to about 30 kPa, then the particles may remain in the pre-expander until the pressure in the particles is about equal to that in the pre-expander.

As mentioned herein above, according to conventional practice, after the particles are pre-expanded, the pressure in the pre-expander is gradually brought down to zero and air is injected through the pre-expander and vented there from. However, in the invention the pressure in the pre-expansion unit is maintained, and for the drying process of the particles, preferably hot dry air is injected into the pre-expander and is retained instead of being completely vented into the external environment. This hot dry air may have a temperature ranging from about 20° to about 90° C. and a pressure ranging from about 1 kPa to about 10 kPa. The hot dry air may be directed to flow over the particles for about 1 to about 900 seconds without venting all the pressure from the particles and without venting all the air into the environment, the result being that very little or no residual hydrocarbons, e.g. pentane, generally used as a blowing agent in EPS particles, are emitted into the atmosphere.

The pre-expanded, dried particles can be immediately transferred to a conventional molding machine. Foam articles are molded under pressure in the presence of steam using any of a number of methods and apparatus that are well known to those skilled in the art.

When the particles exit the pre-expansion unit, the particles will be over-pressurized, e.g. having a pressure ranging from about 30 kPa to about 200 kPa. When the beads enter the molding machine, the partial gas pressure inside the particles is greater than the air pressure inside the molding machine, which allows the particles to further expand and fuse together upon further heating.

For the molding step, the process of the invention uses the residual gas pressure, and in some instances, the residual blowing agent in the particles to adequately fuse the particles together. If there is very little or no residual blowing agent in the particles for the molding step, then the residual gas pressure in the particles will be sufficient to adequately fuse the particles together.

As discussed herein above, the production rate of the molding machine may be such that the particles cannot be immediately transferred to the molding machine after the pre-expanding/drying steps. In this instance, the particles can be conveyed to a pressure silo, which may be connected to the molding machine. The pressure silo is constructed such that pressure will be held and maintained in the particles. This pressure in the particles may range from about 30 kPa to about 200 kPa.

In the invention, a relatively high pressure is first created in the particles and then an adequate pressure is maintained in the particles throughout the pre-expanding and drying steps so that an adequate pressure exists in the particles for the molding step.

From the above, it can be appreciated that the process of the invention provides for a sufficient pressure existing in the particles for the pre-expanding/drying steps and for the molding step regardless of the amount and/or type of blowing agent initially incorporated in the particles or remaining in the particles in the pre-expanding and molding steps. In the pre-expanding, drying, and molding steps, the particles are expanded by using the residual gas pressure, and in some instances, the residual blowing agent in the particles.

Suitable gases for the pressurization unit are air, carbon dioxide, nitrogen, and mixtures thereof. The preferred gas is selected from the group consisting of air, carbon dioxide, and mixtures thereof.

The process of the invention may find particular application with water blown expandable polymer particles, preferably water blown expandable polystyrene particles (WEPS), which uses water as the blowing agent, as those particles disclosed in the aforesaid U.S. Pat. Nos. 6,127,439; 6,160,027; and 6,242,540. In order to achieve densities of 20 kg/m$^3$ or less, it has been found that the injection of high pressurized gas, i.e. ranging between 500 to 2500 bars for about 15 minutes to about 7200 hours at temperatures ranging between 20 to 90° C. according to the teachings of the invention creates an equivalent pressure in the "cell nuclei". This pressure existing in the cells of the particles can then be used to expand the polymer of the particles where the high pressure inside the particles causes the expansion of the cells resulting in the desired lower densities of 20 kg/m$^3$ or less.

As discussed herein above, for the pressurization step, the particles are subjected to a highly pressurized gas. This highly pressurized gas, in effect, may be used as the blowing agent. The applying of this highly pressurized gas to the particles can occur at the molder's location prior to the particles being pre-expanded and molded. The applying of this high-pressured gas to the particles at the molder's facility may eliminate the shelf-life problem generally associated with conventional EPS in which all the blowing agent, e.g. pentane is added at the resin supplier's facility.

In the pressurization step, the pressurized gas may be air. It has been found that the use of pressurized air may eliminate some of the disadvantages associated with the use of water as the blowing agent. The diffusion rate of air through polystyrene is less efficient and therefore less rapid than water vapor, and therefore, air generally will remain in the particles for a longer period of time than water. Air can be heated to any temperature and still be effective in pressurizing the particles, whereas water and pentane, the most common blowing agents, need to be heated above their boiling point in order to soften and expand the polymer. Another advantage of using pressurized air in the particles is that air does not condense in the cells after expansion, thereby contributing to the elimination of the maturing step between the pre-expansion and molding steps.

Alternatively, for the pressurization step, the pressurized gas may be carbon dioxide. There is an advantage in using carbon dioxide as the pressurized gas in the pressurization step and as a blowing agent in the particles, especially those that are pre-nucleated or non-nucleated particles prepared according to the aforesaid U.S. Pat. Nos. 6,455,599, 6,538,042, and 6,573,306, or are solid polystyrene particles that are impregnated with carbon dioxide gas and then pre-nucleated according to U.S. Pat. No. 6,573,306 in that the efficiency of the process of the invention generally may be increased. Carbon dioxide is better soluble in the polymer matrix, and a higher load of pressurizing gas may therefore be obtained for carbon dioxide compared to air or nitrogen. Also, the kinetics of carbon dioxide absorption is better. Finally, a carbon dioxide based process may allow the recycling of industrial $CO_2$, thereby making better use of this greenhouse gas.

The process of the invention essentially involves pressurizing expandable polymer particles, pre-expanding and drying the pressurized particles, and directly placing the pre-expanded particles into the molding machine. It is apparent that both the aging bag, which is used conventionally for the processing of EPS particles, and a second pressure vessel, which is used conventionally for processing EPP and EPE particles, may be eliminated.

As stated herein above, the particles may be expandable polyethylene (EPE) or expandable polypropylene (EPP). For these particles, the common blowing agents such as pentane, carbon dioxide, or CFC'S diffuse out of the particles very quickly so that the unexpanded beads impregnated with the blowing agent cannot be easily shipped to the molder's location for expansion.

Instead, a typical process for EPE and EPP particles is to first produce extruded mini-pellets with suitable additives. These mini-pellets are then suspended in water with suspending agents in a manner known to those skilled in the art. The blowing agents are added at high temperatures and pressures in relatively small pressure vessels. While the pellets are still at a high temperature and pressure, the vessel contents are quickly discharged to atmospheric pressure where the particles expand to final bulk densities ranging from about 16 kg/m$^3$ to about 80 kg/m$^3$ (1 to about 5 lbs/ft$^3$). The fully expanded particles are aged and dried prior to conveying, packaging, and shipping to the molder's location. This generally involves the associated costs of shipping "air", i.e. very light weight particles long distances.

Once at the molder's location, the particles usually need to be re-inflated with a gas, typically air, prior to molding. This requires large pressure vessels since the bulk density of the particles is extremely low. The air pressure must be gradually increased over a 4 to 24 hour period in order to avoid the particles from collapsing which generally happens if the pressure is excessive and applied rapidly. Once the particles are inflated, they must be held under pressure and/or molded quickly before the air within the cell structure dissipates.

The process of the invention may be particularly applicable in processing EPP and EPE particles. The pressurization unit can be located at the molder's location and used prior to pre-expanding and molding.

The invention is further illustrated, but is not limited by, the following examples, which pertain to expandable polystyrene particles.

EXAMPLES

Example 1

This example pertains to pre-nucleated polystyrene beads containing water as a blowing agent. These beads were produced in accordance with the teachings of the aforesaid U.S. Pat. No. 6,127,439 which discloses the use of polar water absorbing polymers as water retaining agents, and in accordance with the teachings of the aforesaid U.S. U.S. Pat. No. 6,538,042(WO 00/15703) and U.S. Pat. No. 6,455,599 B1 (WO 00/15704), which respectively disclose pre-nucleated beads and a process to obtain these beads.

This example shows that the pre-nucleated beads can be expanded and molded by first pressurizing the beads, and then pre-expanding and molding the beads without maturing the beads between the pre-expansion and molding steps.

In order to obtain pre-nucleated beads, about 4-liters of beads (screened size fraction 0.900-1.250 mm) were partially expanded with steam in an Erlenbach PVD-80 batch pre-expander (previously Polytech PVD-80). The initial density of the beads prior to pre-nucleation was about 600 kg/m$^3$, and the density of the slightly expanded pre-nucleated beads was about 419 kg/m$^3$.

These four liters of pre-nucleated beads were then pressurized in a batch vessel (having a 4 liter volume) with compressed air at 2250 kPa for 16 hours at room temperature and then were transferred under 200 kPa pressure to an agitated 100-liter expansion vessel. This expansion vessel had an air pressure of 5 kPa. The beads were treated with steam at a supply pressure of 70 kPa for 20 seconds to expand them to a final density of 34 kg/m$^3$. The resulting wet foamed beads (referred to as "pre-puff" or "pre-foam") were then dried by blowing air at room temperature for 180 seconds through the pre-expansion vessel while a positive pressure of 30 kPa was retained in the vessel. From the expansion vessel, the beads were transported to a conventional molding machine (Kurtz K45 with a molding cavity measuring 300 mm by 300 mm by 50 mm). The residual air pressure inside the beads acted as a blowing agent during the subsequent molding step. In the molding machine, the pressure was released and the machine was operated at a conventional molding cycle, i.e. set pressure of 100 kPa; steam time of 8 seconds; and foam pressure demolding of 15 kPa.

The resultant foam molding had a density of 37 kg/m$^3$. From visual inspection, the beads were well fused and virtually no shrinkage of the foam occurred. The cross-breaking strength of the resultant foam was measured according to CEN 12089 with a value of 204 N at this foam density.

Example 2

This example involves pre-nucleated polystyrene beads that contain a small amount of pentane as a blowing agent. These pre-nucleated beads were produced in accordance with the teachings of the aforesaid U.S. U.S. Pat No. 6,538,042(WO 00/15703) and U.S. Pat. No. 6,455,599 B1 (WO 00/15704). The process and equipment for Example 2 were similar to that used in Example 1.

This example shows that pre-nucleated beads can be expanded and molded by first pressurizing the beads, and then pre-expanding and molding the beads without maturing the beads between the pre-expanding and molding steps.

In order to form the pre-nucleated beads, about 4.0 liter of beads having an initial density of about 600 kg/m$^3$ and containing about 1.9% by weight pentane as the blowing agent were partially expanded with hot air to a lower density of 400 kg/m$^3$. The amount of blowing agent that remained in the beads after this partial expansion was 1.2% by weight based on the weight of the beads.

These four liters of pre-nucleated beads were then pressurized in a batch vessel of Example 1 with compressed air at 2250 kPa for 16 hours at room temperature and then transferred under 200 kPa pressure to the agitated expansion vessel of Example 1. The expansion vessel had an air pressure of 5 kPa. The beads were then treated with steam at a supply pressure of 70 kPa for 20 seconds to expand them to a final density of 19 kg/m$^3$. The resulting wet foamed beads were then dried by blowing air at room temperature for 180 seconds through the pre-expansion vessel while a positive pressure of 30 kPa was retained in the vessel. From the expansion vessel, the beads were transported to a conventional molding machine of Example 1. In the molding machine the pressure was released and the machine was operated at a conventional molding cycle with the same settings as that of Example 1.

The resultant foam had a density of 19.5 kg/m$^3$. From visual inspection, the beads were well fused and virtually no shrinkage of the foam occurred. The cross-breaking strength of the resultant foam was measured according to CEN 12089 with a value of 176 N at this foam density. This value is comparable to that obtained with conventional EPS beads.

Example 3

Raw beads similar to that used in Example 2 were pre-nucleated to a density of about 380 kg/m$^3$, and were processed similar to that of Example 2. The pressure in the pre-expander was held at 30 kPa. These particles before molding had a density of 17 kg/m$^3$. The particles were transferred to a pressure silo where a pressure of 30 kPa was applied to the particles. The particles were then molded for 23 seconds at a steam pressure of 90 kPa. The foam produced had a density of 20 kg/m$^3$. The cross breaking strength was measured according to CEN 12089 with a value at this density of 221 N.

Several additional runs were performed with the raw beads where the pressure in the pre-expander was decreased until 15 kPa for the first run, 10 kPa for the second run, and 8 kPa for the third run. The respective densities of the beads before molding were 15 kg/m$^3$, 16 kg/m$^3$, and 16 kg/m$^3$. The beads were molded for 17 to 19 seconds at a steam pressure of 90 kPa. The foam produced had a density of 18 kg/m$^3$, 19 kg/m$^3$, and 18 kg/m$^3$, respectively with respective cross breaking strengths of 183 N, 172 N, and 163 N.

This example illustrates that the lower the air pressure of the pre-expander, the lower the value of the cross breaking strength. Thus, it may be more desirable in most instances to maintain a pressure of 30 kPa or greater in the pre-expander for better strength foam products.

Example 4

This example pertains to solid polystyrene beads that are impregnated with carbon dioxide and then pre-nucleated, i.e. slightly expanded to 400 kg/m³, similar to the teachings of the aforesaid U.S. Pat. No. 6,573,306. This example also uses air as the pressurized gas in the pressurization unit.

This example shows that beads impregnated with carbon dioxide and then pre-nucleated can be over-pressurized with air, pre-expanded, and molded without maturing the beads between the pre-expansion and molding steps.

To produce the beads initially used in this example, about 20 liters of solid polystyrene beads with a density of 630 kg/m³ were pressurized in a pressure vessel with carbon dioxide for 3 hours at a pressure of 500 kPa at room temperature so as to impregnate the beads with carbon dioxide. This impregnation step was followed by a pre-nucleation step with a batch steam expander (Erlenbach PVD-80). The pre-nucleated beads were then processed with equipment and conditions similar to that of Example 1. That is, the pre-nucleated beads were then pressurized in a batch vessel (having a 4 liter volume) with compressed air at 2250 kPa for 16 hours at room temperature and then were transferred under 200 kPa pressure to an agitated 100-liter expansion vessel. This expansion vessel had an air pressure of 5 kPa.

The beads were treated with steam at a supply pressure of 70 kPa for 20 seconds to expand them to a final density of 20 kg/m³. The resulting pre-puff beads were dried by blowing air at room temperature for 180 seconds through the pre-expansion vessel while a pressure of 30 kPa was retained in the pre-expansion vessel.

From the pre-expansion vessel, the beads were transported to a conventional molding machine (Kurtz K45 used in Example 1). The residual air pressure in the beads helped to expand the beads further in the molding step. In the molding machine, the pressure was released and the machine was operated at a conventional molding cycle, i.e. set pressure of 100 kPa; steam at 8 seconds; and foam pressure demolding of 15 kPa.

The resultant foam molding had a density of 26 kg/m³. From visual inspection, the beads were well fused and virtually no shrinkage of the foam occurred. The cross-breaking strength of the resultant foam was measured according to CEN 12089 with a value of 330 N at this foam density.

While the present invention has been set forth in terms of specific embodiments thereof, it will be understood in view of the instant disclosure that numerous variations upon the invention are now enabled yet reside within the scope of the invention. For example, it is to be appreciated that both the pre-expansion and the molding units may be equipped with a separate pressure supply source. Accordingly, the invention is to be broadly construed and limited only by the scope and spirit of the claims now appended hereto.

What is claimed is:

1. A process for processing polymer particles which optionally contain a blowing agent, the steps consisting of:
   a) in a pressurization unit, over-pressurizing said polymer particles with a high pressurized gas to create a high gas pressure inside said particles;
   b) immediately transferring said particles to a pre-expander and pre-expanding said particles with a heating medium to form pre-expanded particles, and directing a flow of hot dry air onto said pre-expanded particles to dry said pre-expanded particles in the pre-expander while maintaining sufficient positive pressure in said pre-expanded particles which pressure is above atmospheric pressure and below the gas pressure in said particles as a result of step a);
   c) without maturing said pre-expanded particles, immediately injecting said pre-expanded particles into a molding machine and molding said pre-expanded particles into a foam article using at least the residual gas pressure in said particles; and
   after step b) and prior to step c), optionally transferring said pre-expanded particles of step b) directly from said pre-expander to a pressure silo to maintain the pressure in said pre-expanded particles.

2. The process of claim 1, wherein said gas in the over-pressuring of said particles of step a) has a temperature ranging from about −20° to about 130° C. and a pressure ranging from about 500 kPa to about 8000 kPa and said over-pressurizing occurs for about 15 to about 7200 minutes.

3. The process of claim 2, wherein said polymer is polystyrene and said gas has a temperature of about 90° C. or less.

4. The process of claim 3, wherein said heating medium for said pre-expanding of said particles of step b) has a temperature ranging from about 100° C. to about 120° C. and a pressure ranging from about 50 kPa to about 200 kPa and is applied to said particles for a time ranging from about 5 to about 120 seconds.

5. The process of claim 1, wherein said drying of said pre-expanded particles in step b) consists of an air flow having a temperature ranging from about 20° to about 90° C. and a pressure ranging from about 1 kPa to about 10 kPa and is applied to said pre-expanded particles for a time ranging from about 1 to about 900 seconds.

6. The process of claim 1, wherein in steps b) and c), the pressure in said particles is maintained at least at a pressure ranging from about 50 kPa to about 200 kPa.

7. The process of claim 1, wherein said pressurized gas in step a) is selected from the group consisting of air, nitrogen, carbon dioxide, and mixtures thereof.

8. The process of claim 1, wherein said pressurized gas in step a) is selected from the group consisting of air, carbon dioxide, and mixtures thereof.

9. The process of claim 1, wherein said heating medium in said step b) is selected from the group consisting of steam, hot air, hot water, radiant heat, microwaves, high frequency radiation, and electromagnetic waves.

10. The process of claim 1, wherein said polymer is selected from the group consisting of polystyrene, polyethylene, polypropylene, and an interpenetrating network of polyethylene and polymerized vinyl aromatic resins.

11. The process of claim 10, wherein said polymer is polystyrene.

12. The process of claim 1, wherein said polymer particles contain a blowing agent selected from the group consisting of an inorganic blowing agent, an organic blowing agent, and mixtures thereof.

13. The process of claim 1, wherein said polymer particles are polystyrene, are pre-nucleated, and contain an organic blowing agent in an amount less than 3 percent by weight based on the weight of the particles.

14. The process of claim 1, wherein said polymer particles are pre-nucleated and contain an inorganic blowing agent selected from the group consisting of carbon dioxide, nitrogen, air, water, and mixtures thereof, and wherein said pressurized gas in step a) is selected from the group consisting of air, nitrogen, carbon dioxide, and mixtures thereof.

15. The process of claim 1, wherein said particles are pre-nucleated and contain carbon dioxide as the blowing agent, and wherein the gas in step a) is selected from air and carbon dioxide.

16. The process of claim 1, wherein said particles are comprised of solid polystyrene particles that are impregnated with carbon dioxide and then pre-nucleated, and wherein the pressurized gas in step a) is selected from air and carbon dioxide.

* * * * *